(12) United States Patent
Takamura et al.

(10) Patent No.: US 10,839,690 B2
(45) Date of Patent: Nov. 17, 2020

(54) COMMUNICATION DEVICE, COMMUNICATION PROGRAM, AND RECORDING MEDIUM RECORDING COMMUNICATION PROGRAM

(71) Applicant: MICWARE CO., LTD., Kobe-shi, Hyogo (JP)

(72) Inventors: Kenichiro Takamura, Kobe (JP); Tomohiro Kitagawa, Kobe (JP); Kazuhiro Otsuki, Kobe (JP); Teruaki Koshiba, Kobe (JP); Yuya Yamamoto, Kobe (JP)

(73) Assignee: MICWARE CO., LTD., Kobe (JP)

( * ) Notice: Subject to any disclaimer, the term of this patent is extended or adjusted under 35 U.S.C. 154(b) by 0 days.

(21) Appl. No.: 16/547,189

(22) Filed: Aug. 21, 2019

(65) Prior Publication Data

US 2019/0378413 A1    Dec. 12, 2019

Related U.S. Application Data

(63) Continuation of application No. 15/694,178, filed on Sep. 1, 2017, now Pat. No. 10,438,491.

(30) Foreign Application Priority Data

Sep. 9, 2016    (JP) ................................. 2016-176626

(51) Int. Cl.
*G08G 1/16* (2006.01)
*H04W 4/70* (2018.01)
(Continued)

(52) U.S. Cl.
CPC ............. *G08G 1/166* (2013.01); *G08G 1/163* (2013.01); *H04W 4/44* (2018.02); *H04W 4/46* (2018.02); *H04W 4/70* (2018.02)

(58) Field of Classification Search
CPC ....................................................... H04W 4/44
See application file for complete search history.

(56) References Cited

U.S. PATENT DOCUMENTS

2007/0159354 A1    7/2007    Rosenberg
2011/0193725 A1    8/2011    Wise et al.
(Continued)

FOREIGN PATENT DOCUMENTS

EP         0493822 A1 *    7/1992    ............... G01S 7/22
JP         2005-43187 A        2/2005
(Continued)

OTHER PUBLICATIONS

Japanese Office Action, dated Oct. 23, 2019, for Japanese Application No. 2016-176626, along with an English machine translation.
(Continued)

*Primary Examiner* — Nabil H Syed
*Assistant Examiner* — Cal J Eustaquio
(74) *Attorney, Agent, or Firm* — Birch, Stewart, Kolasch & Birch, LLP

(57) ABSTRACT

A communication device accurately reports the position a vehicle or a pedestrian with respect to a local vehicle and supports safer driving. The communication device is mounted on a moving body and includes a communication unit that receives communication information according to a preset communication condition, a determination unit that determines whether a service is provided in accordance with the received communication information and a display controller that displays display information needed to provide the service on a map displayed on a display unit, when the service is provided according to a result determined by the determination unit.

8 Claims, 13 Drawing Sheets

(51) Int. Cl.
*H04W 4/46* (2018.01)
*H04W 4/44* (2018.01)

(56) References Cited

U.S. PATENT DOCUMENTS

2017/0131719 A1    5/2017  Micks et al.
2017/0201461 A1*   7/2017  Cheng ................... H04L 47/32
2018/0257642 A1*   9/2018  Sherony ................ B60W 10/18

FOREIGN PATENT DOCUMENTS

JP    3899562 B2      3/2007
JP    2011-150630 A   8/2011

OTHER PUBLICATIONS

Japanese Office Action for Japanese Application No. 2016-176626, dated Jun. 2, 2020, with English translation.

* cited by examiner

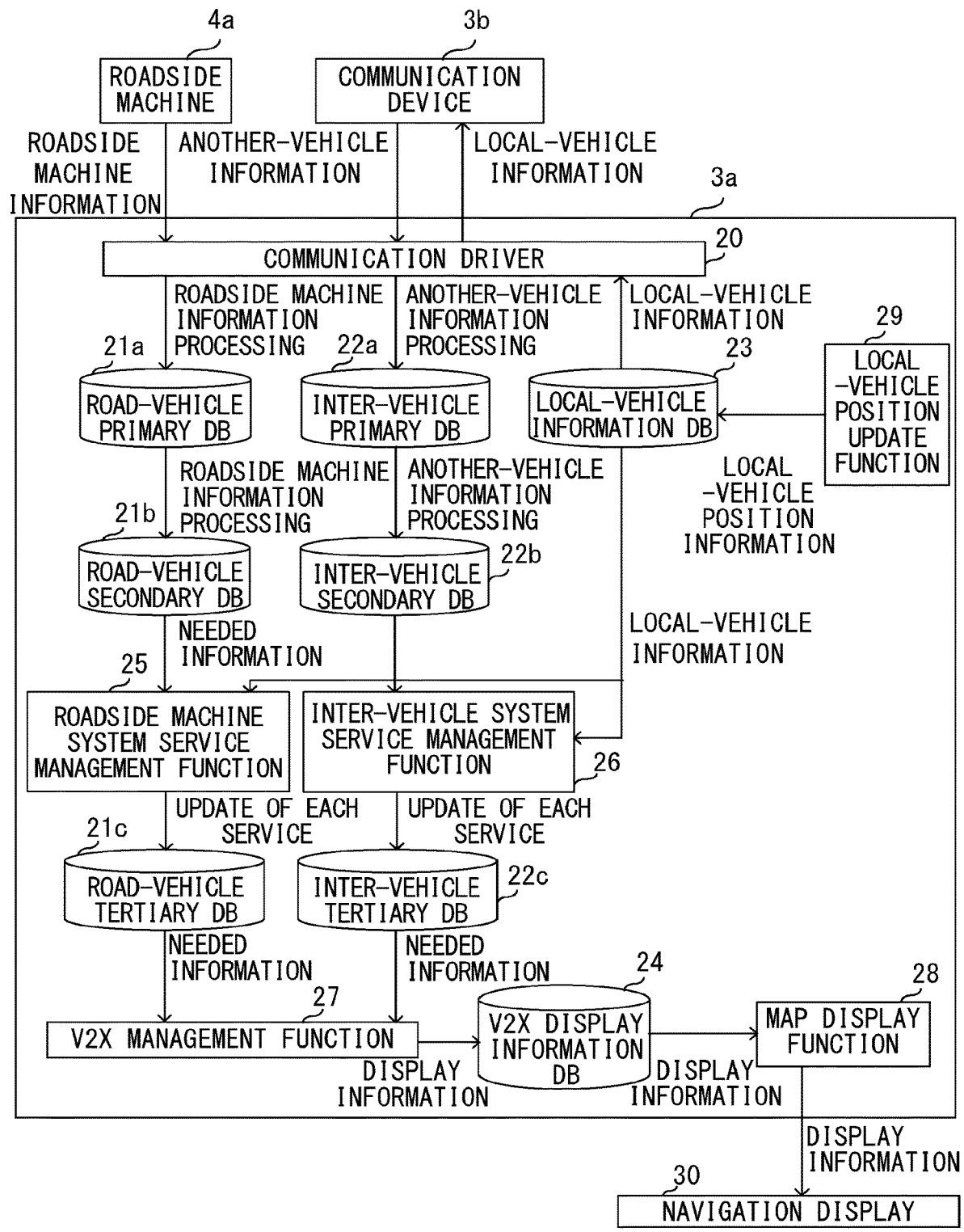
F I G. 2

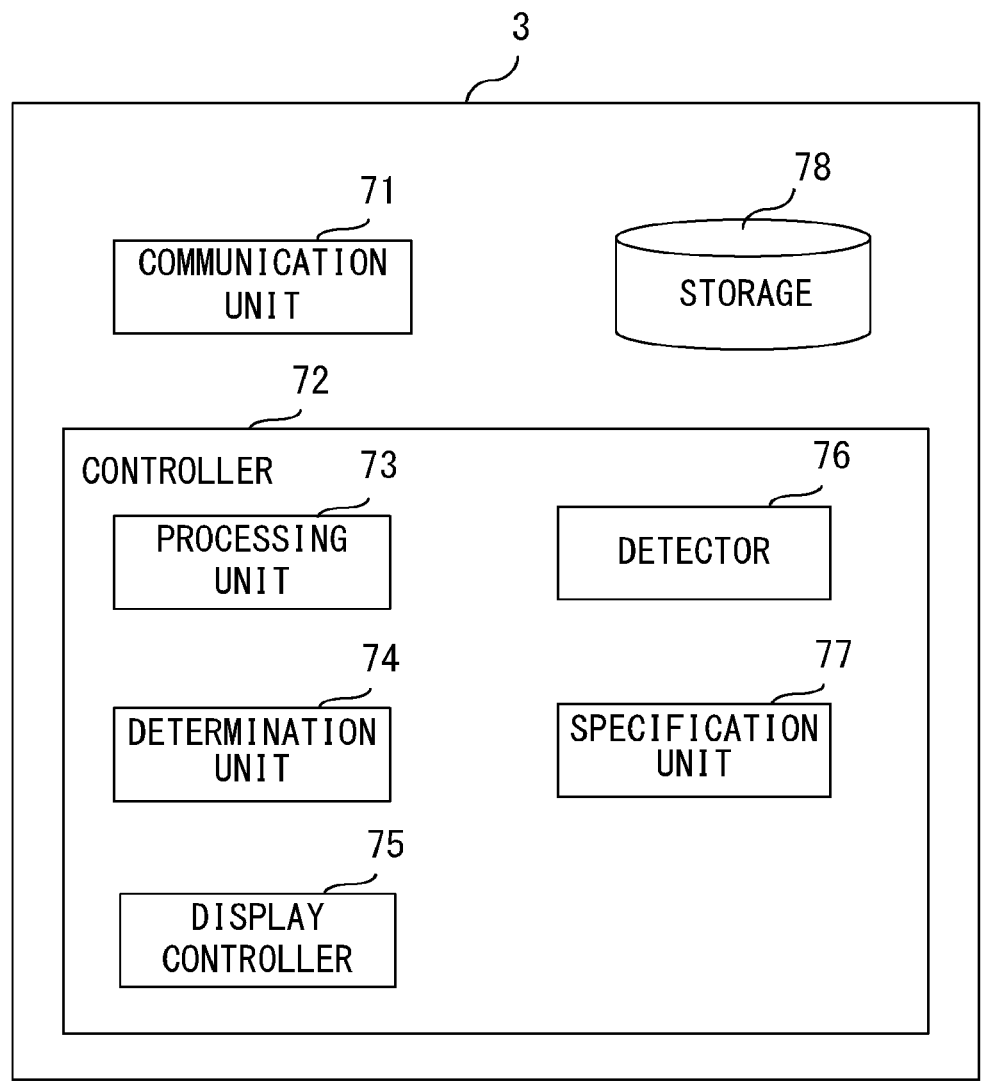
F I G. 7

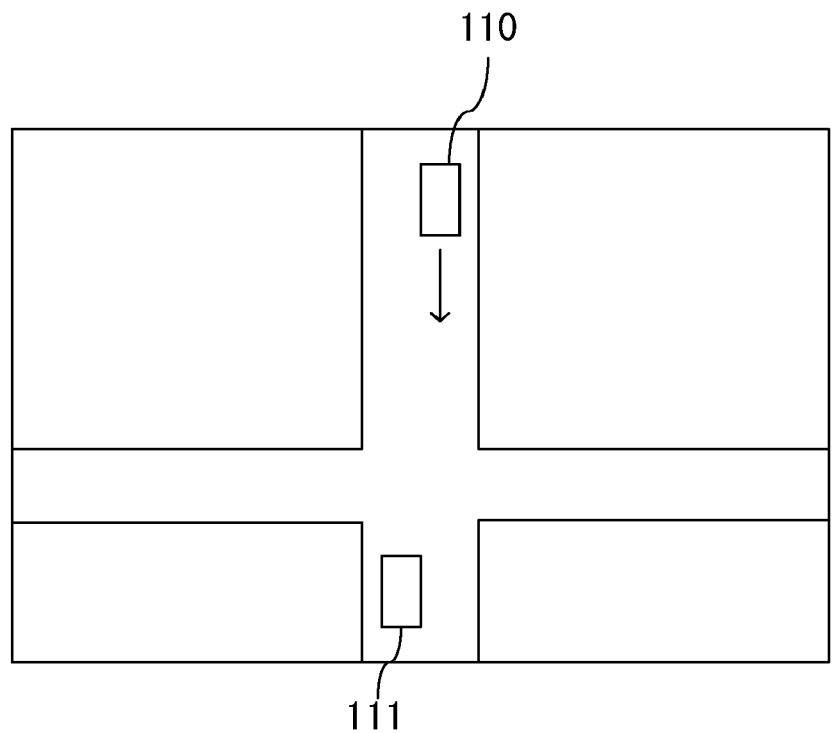
F I G. 1 1 A
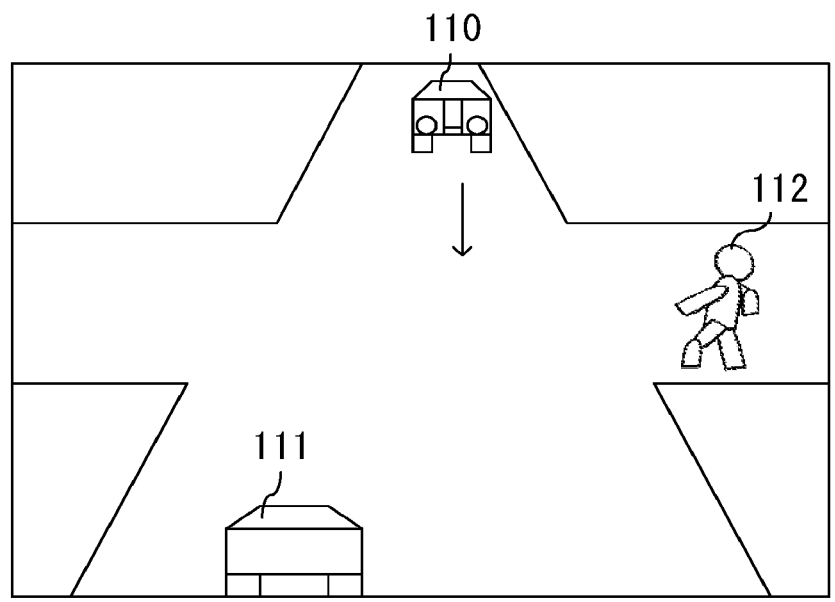
F I G. 1 1 B

COMMUNICATION DEVICE, COMMUNICATION PROGRAM, AND RECORDING MEDIUM RECORDING COMMUNICATION PROGRAM

CROSS-REFERENCE TO RELATED APPLICATIONS

This application is a Continuation of U.S. application Ser. No. 15/694,178 filed Sep. 1, 2017, which is based upon and claims the benefit of priority of the prior Japanese Patent Application No. 2016-176626, filed on Sep. 9, 2016. The entire contents of each of the above-identified applications are incorporated herein by reference.

FIELD

The present embodiment relate to a communication device mounted on a moving body, a communication program, and a recording medium that records the communication program.

BACKGROUND

Currently, vehicle-to-everything communication (V2X communication) is proposed in which vehicles and an infrastructure cooperate with each other, and the vehicles and various objects (such as vehicles, traffic signals, persons, bicycles, or motorcycles) communicate with each other such that information can be exchanged. By using V2X communication, various attempts have been made to achieve a safe and efficient traffic system.

As an example, in order to support safe driving, a technology has been considered for determining whether a vehicle or a pedestrian exists around a driver, by utilizing information obtained in V2X communication, and for displaying information (an attention-attracting display) indicating the existence of the vehicle or the pedestrian when the vehicle or the pedestrian exists.

SUMMARY

According to an aspect or the present embodiment, a communication device mounted on a moving body includes: a communication unit that receives communication information according to a preset communication condition; a determination unit that determines whether a prescribed service will be provided in accordance with the received communication information; and a display controller that displays display information needed to provide the prescribed service on a map displayed on a display unit, when the prescribed service is to be provided according to a determination result.

According to an aspect of the present embodiments, a communication device mounted on a moving body includes a processor to receive communication information according to a preset communication condition, to determine whether a service is provided in accordance with the received communication information, and to display display information needed to provide the service on a map displayed on a display unit, when the service is provided.

Further, according to an aspect of the present embodiments, a non-transitory computer readable recording medium is provided that, has recorded therein a communication program for causing a communication device mounted on a moving body to receive communication information according to a preset communication condition, to determine whether a prescribed service will be provided in accordance with the received communication information, and to display display information needed to provide the prescribed service on a map displayed on a display unit, when the prescribed service is to be provided according to a determination result.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF THE DRAWINGS

FIG. 2 is a block diagram illustrating the communication system including the communication device according to the embodiment.

FIG. 7 is a block diagram illustrating an example of a function configuration of the communication device according to the embodiment.

FIG. 11A illustrates an example of a display in which a positional relationship on a map between a specified vehicle and the local vehicle is viewed from the top according to the embodiment.

FIG. 11B illustrates an example of a display in winch a specified vehicle approaching the local vehicle is viewed from a side of the local vehicle according to the embodiment.

DESCRIPTION OF THE EMBODIMENTS

Figure 1:
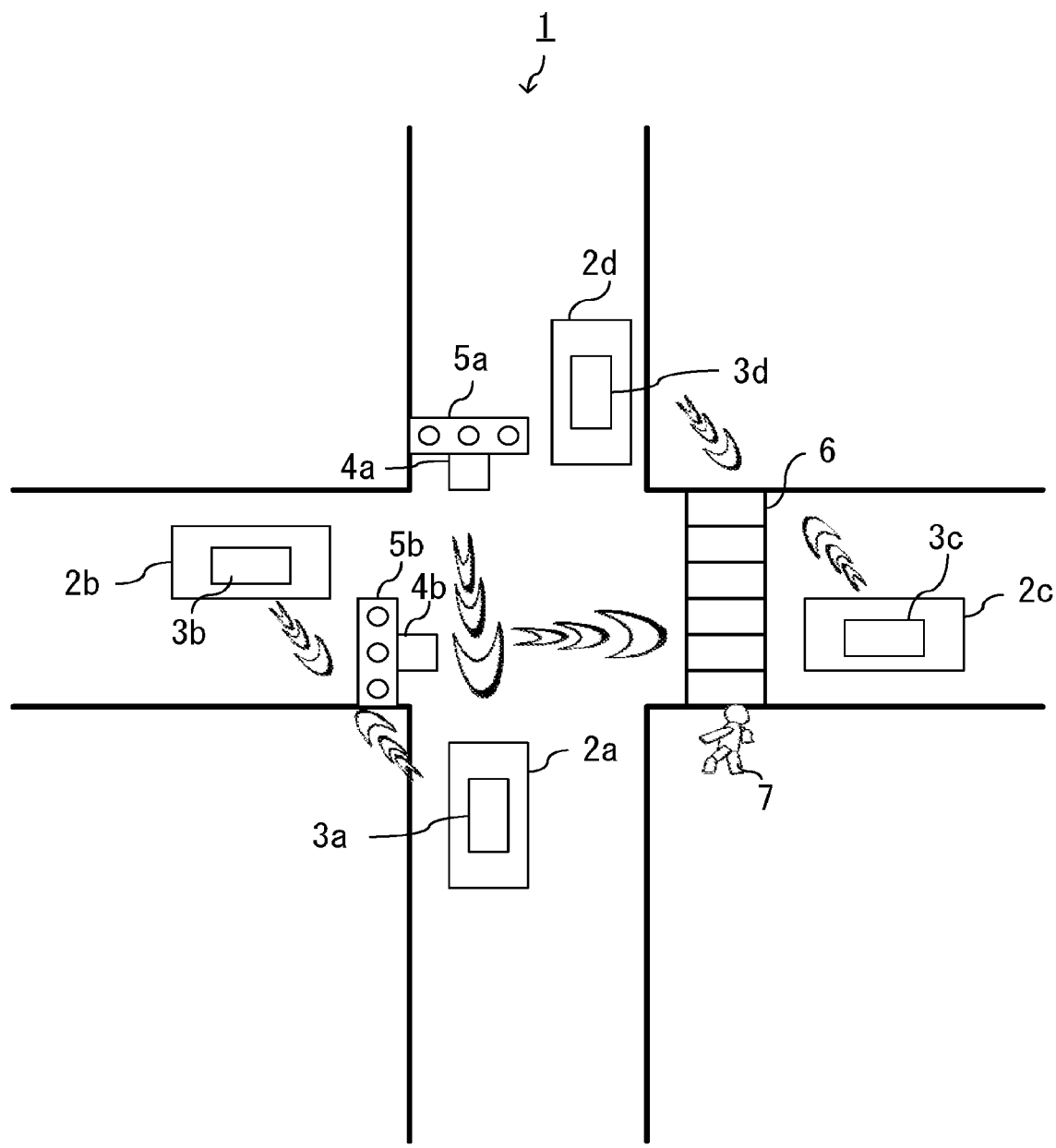
FIG. 1 is a schematic diagram illustrating a communication system including a communication device according to an embodiment at an intersection.

Embodiments of the present invention a e described below in detail with reference to the drawings FIG. 1 is a schematic diagram illustrating a communication system 1 including a communication device 3 (3a to 3d) according to an embodiment at an intersection. FIG. 2 is a block diagram illustrating a portion of the communication system 1 including the communication device 3 according to the embodiment. As illustrated in FIG. 1, the communication system 1 is configured by a communication device 3 (3a to 3d) that can be mounted on a vehicle 2 (2a to 2d) and a roadside machine 4 (4a and 4b). Here, the communication system 1 is described by using an intersection as an example, but the communication system 1 is not always utilized at the intersection, and the communication system 1 can also be utilized in other place (for example, a junction in which, roadways join together).

FIG. 1 illustrates four vehicles 2 (2a to 2d) that enter an intersection including traffic signals 5 (5a 5b), and the communication device 3 (3a to 3d) is mounted on each of the vehicles 2. FIG. 1 also illustrates a pedestrian 7 who is about to cross a crosswalk 6 at the intersection. In this example, the vehicle 2 is a moving body such as a four-wheeled vehicle, a two-wheeled vehicle, or a bicycle. In addition, the communication device 3 is not limited, for example, to a car navigate device installed onto a vehicle, and may be, for example, a portable terminal such as a smartphone having navigation function.

The configuration of the communication system 1 is not limited to the configuration above, and the communication system 1 may have configuration in which one roadside machine 4 is installed at one intersection without installing one roadside machine 4 onto each of the traffic signals 5.

In FIG. 1, only the vehicles 2 enter the intersection, but in a case in which a pedestrian who possesses a portable communication device 3 such enters as a the smartphone intersection, the communication device 3 that is possessed by the pedestrian may become a component of the communication system 1, similarly to the communication device 3 mounted on the vehicle 2. In this case, the pedestrian, who is a moving body, corresponds to the vehicle 2. The communication device 3 possessed by the pedestrian can perform V2X communication with another communication device 3 and the like, and can communicate information with the communication device 3 mounted on the vehicle 2 or the roadside machine 4 such that the prescribed service described later can be provided to the pedestrian. In other words, the communication device 3 possessed by the pedestrian corresponds to a communication device mounted on a moving body.

The roadside machine 4 is installed in a place in which V2X communication can be performed with the communication device 3 (for example, at a roadside, in an intersection, or the like), and the roadside machine 4 detects, for example, a vehicle or a pedestrian in the intersection, or a vehicle or a pedestrian that approaches the intersection, by using a sensor. The roadside machine 4 regularly or irregularly outputs a detection result (roadside machine information) to the outside in V2X communication. As an example, the roadside machine 4 regularly or irregularly output the detection result (the roadside information) to the outside at a frequency of at least several tens of times per second in V2X communication. The output roadside machine information is received, for example, by the communication device 3 mounted on the vehicle 2 entering the intersection or the communication device 3 possessed by the pedestrian entering the intersection.

The roadside machine 4 may be a portion of the configuration of a traffic signal, or may be configured to be independent of the traffic signal. Road-vehicle V2X communication that is performed between an infrastructure such as the roadside machine 4 and the communication device 3, as described above, is referred to as road-vehicle communication, Inter-vehicle V2X communication that is performed between the communication devices 3, as described later, is referred to as inter-vehicle communication, and is communication that is performed, for example, between the communication device 3a and the communication device 3b.

Information obtained in road-vehicle V2X communication or inter-vehicle V2X communication is referred to as V2X information (communication information). Examples of the content of road-vehicle V2X information include information relating to a waiting time at a red light, information relating to the shape of a road, information relating to the number of road lanes, and information relating to a travelling direction of a vehicle. Examples of the content of inter-vehicle V2X information include identification information (ID) of the communication device 3 or the vehicle 2 mounted with the communication device 3, information relating to the position of the vehicle 2, information relating to the speed of the vehicle 2, and information relating to the size of the vehicle 2. The V2X information is not limited to the information above, and may include any other information needed to support safe driving.

The V2X information is not limited to information obtained in road vehicle V2X communication or inter vehicle V2X communication. Namely, the V2X information may include emergency information reported from an emergency information reporting system in V2X communication, such as disaster information, emergency vehicle information, or ambulance information that is obtained by utilizing a satellite system such as a global navigation satellite system (GNSS).

A preset communication condition is, for example, a condition wherein V2X information relating to V2X is directly communicated between a road and a vehicle or between vehicles. The preset communication condition is not limited to the condition wherein the V2X information relating to V2X is directly communicated between a road and a vehicle or between vehicles. The preset communication condition may be a condition wherein communication is indirectly performed via a network such as the Internet. When communication is indirectly performed via the network such as the Internet, the communication system 1 can use, for example, a communication line between cellular phones.

Here, details of the communication device 3 are described. The communication device 3 first receives the V2X information (the communication information) according to the preset communication condition.

Specifically, the communication device 3 (3a) obtains V2X information (roadside machine information) from the roadside machine 4a via a communication driver 20 in V2X communication, and stores the V2X information in a road-vehicle primary DB 21a, as illustrated in FIG. 2. The stored roadside machine information is subjected to processing needed to update each service by using a roadside machine system service management function 25, and is stored in a road-vehicle secondary DB 21b. Namely, the communication device 3a stores the roadside machine information obtained from the roadside machine 4a in the road-vehicle primary DB 21a, processes the roadside machine information, and stores the processed information in the road-vehicle secondary DB 21b.

In addition, the communication device 3 (3a) obtains V2X information (another-vehicle information) from another communication device 3b via the communication driver 20 in V2X communication, and stores the another-vehicle information in an inter-vehicle primary DB 22a, as illustrated in FIG. 2. The stored another-vehicle information is subjected to processing needed to update each of the services by using an inter-vehicle system service management function 26, and the processed information is stored in an inter-vehicle secondary DB 22*b*. Namely, the communication device 3*a* stores another-vehicle information relating to the vehicle 2*b* that is obtained from the communication device 3*b* in the inter-vehicle primary DB 22*a*, processes the another-vehicle information, and stores the processed another vehicle information in the inter-vehicle secondary DB 22*b*.

Further, the communication device 3 (3*a*) includes a local-vehicle position update function 29 that updates the position of the vehicle 2 (2*a*), and updates a local-vehicle position when the position of the vehicle 2 changes, for example, due to travelling, as illustrated in FIG. 2. Information relating to the updated local-vehicle position (local-vehicle position information) is stored in a local-vehicle information DB 23. In the local-vehicle information DB 23, variable information, such as information relating to the speed of the local vehicle that is detected by a not-illustrated detector, information relating to opening or closing of an accelerator, information relating to a brake, information relating o a steering angle of a steering wheel, information indicated by a direction indicator, or information relating to a turn-on state of a head light, variable information such as prescribed size, type, or the like of a vehicle, and other information are also stored. The local-vehicle position information and the information above such as the speed information are managed as local-vehicle information (vehicle information), and the local-vehicle information is output to the outside via the communication driver 20. In addition, the local-vehicle information is transferred to the roadside machine system service management function 25 and the inter-vehicle system service management function 26.

Figure 3:
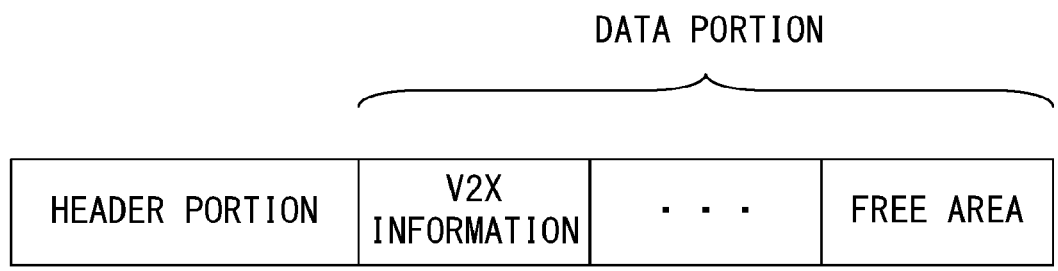
FIG. 3 illustrates an example of a transmission format according to the embodiment.

Here, an example of a transmission format when outputting the V2X information to the outside is described. The transmission format includes a header portion and a data portion, as illustrated in FIG. 3, for example. Information such as a transmission source (the roadside machine 4, the communication device 3, or the like) is stored in the header portion, and the V2X information or the like is stored in the data portion. The data portion may include an area (a free area) to which information is freely written. The presence of the area to which information is freely written enables a higher-quality service (support information) to be provided according to a user (a driver or the like).

Return now to the description of the communication device 3. The communication device 3 provides a prescribed service (support information) for supporting safe driving in accordance with the obtained V2X information (the roadside machine information or the vehicle information) and the local-vehicle information. Namely, the communication device 3 determines whether a prescribed service should be provided to a driver in accordance with the obtained V2X information and the local-vehicle information. According to a determination result, when the prescribed service should be provided, the communication device 3 displays display information needed to provide the prescribed service on a map displayed on a display unit such as a navigation display 30 such that the display information superimposed onto the map. The display information is an icon or character information that can be visually recognized on the map, and as an example, in the case of the right-turn collision prevention support service described later, the display information refers to an icon or character information that indicates an oncoming vehicle or the pedestrian 7 crossing the crosswalk 6.

Specifically, the communication device 3 (3*a*) updates respective prescribed services in accordance with the road-side machine information stored in the road-vehicle secondary DB 21*b* and the local-vehicle information by using the roadside machine system service management function 25, as illustrated in FIG. 2. An update result is stored in a road-vehicle tertiary DB 21*c*. In addition, the communication device 3 (3*a*) updates respective prescribed services in accordance with the another-vehicle information stored in the inter-vehicle secondary DB 22*b* and the local vehicle information by using the inter-vehicle system service management function 26. An update result is stored in an inter-vehicle tertiary DB 22*c*.

Updating of a prescribed service refers to updating of information used to determine whether the prescribed service should be provided, and refers, for example, to updating of position information of another vehicle, a pedestrian, or the like with respect to the local vehicle.

In this example, the primary to tertiary road-vehicle DBs and the primary to tertiary inter-vehicle DBs are provided, but these DBs may be integrated into one DB. In addition, the roadside machine system service management function 25 and the inter-vehicle system service management function 26 individually update services, but these functions may be integrated, and the integrated function may collectively update services.

The communication device 3 (3*a*) determines whether a prescribed service should be provided in accordance with the update results stored in the road-vehicle tertiary DB 21*ca* and the inter-vehicle tertiary DB 22*c*. When it is determined that the prescribed service should be provided, the communication device 3 (3*a*) obtains information needed to provide the prescribed service. The obtained information is stored as display information in a V2X display information DB 24. The communication device 3 (3*a*) causes a map display function 28 to display characters, an icon, or the like on a map of the navigation display in accordance with the display information stored in the V2X display information DB 24.

An example of a prescribed service provided to support safe driving is described next.

Figure 4:
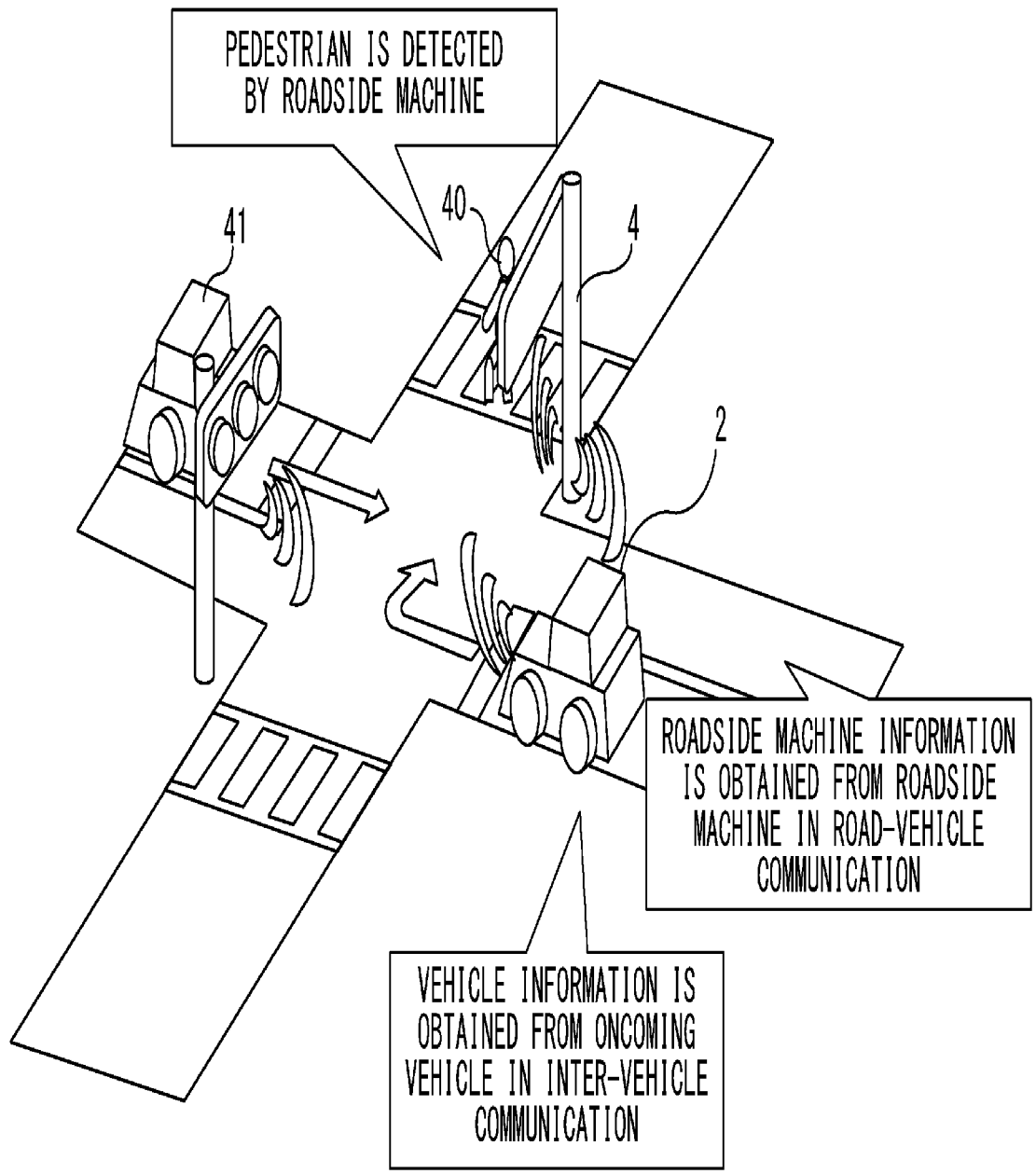
FIG. 4 is a diagram explaining a right-turn collision prevention support service.
Figure 5:
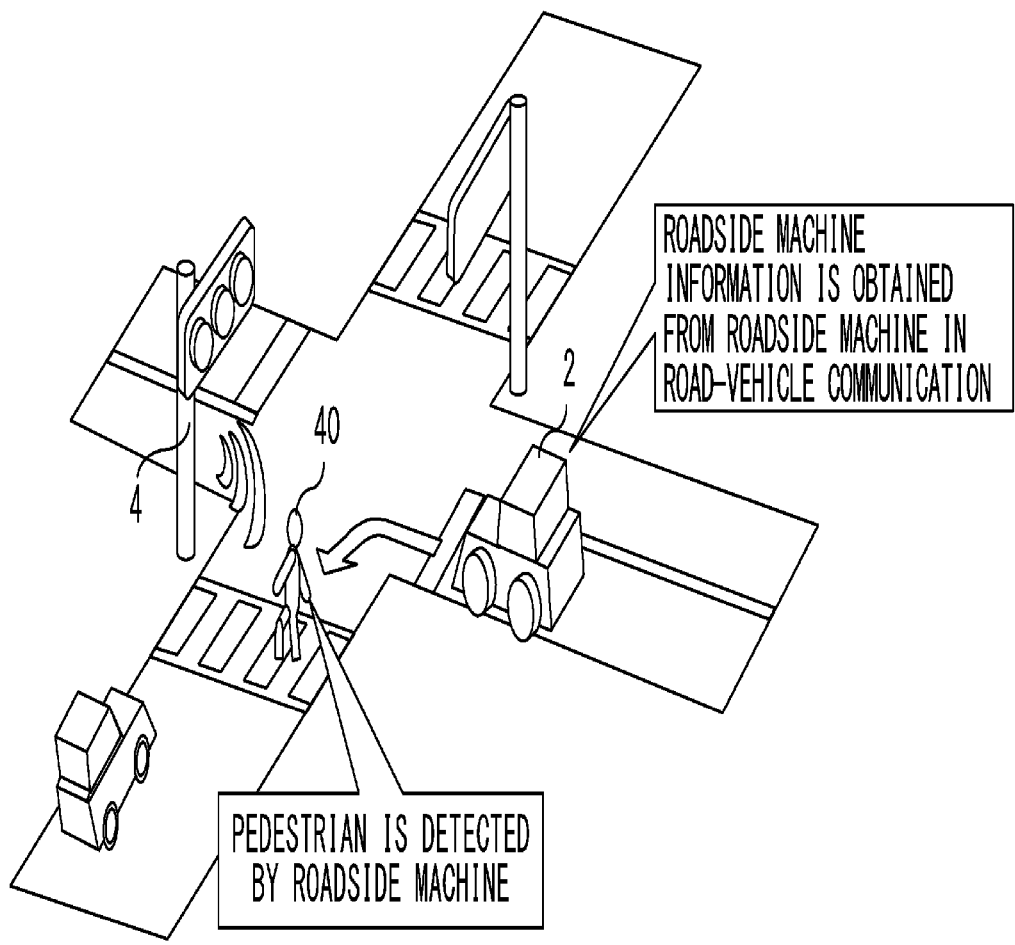
FIG. 5 is a diagram explaining a left-turn collision prevention support service.

First, a right-turn/left turn collision prevention support service is described with reference to FIG. 4 and FIG. 5. FIG. 4 is a diagram explaining a right-turn collision prevention support service, and FIG. 5 is a diagram explaining a left-turn collision prevention support service.

At the time of turning to the right, as illustrated in FIG. 4, a communication device mounted on the vehicle 2 obtains roadside machine information (in this example, information relating to a pedestrian 40) from the roadside machine 4, and also obtains vehicle information of an oncoming vehicle 41 from another communication device mounted on the oncoming vehicle 41. In addition, the communication device mounted on the vehicle 2 obtains vehicle information indicating a right-hand turn as the local-vehicle information on the basis of, for example, the speed information of the local vehicle that has been detected by a detector and information relating to blinking of a right-hand blinker, which is the information indicated by the direction indicator. At the time of turning to the left, as illustrated in FIG. 5, the communication device mounted on the vehicle 2 obtains roadside machine information (in this example, the information relating to the pedestrian 40) from the roadside machine 4. The communication device mounted on the vehicle 2 obtains vehicle information indicating left-hand turn as the local-vehicle information on the basis of, for example, the speed information of the local vehicle that has been detected by a detector and information relating to blinking of a left-hand blinker, which is the information indicated by the direction indicator. At the time of turning to the left, an oncoming vehicle does not need to be considered, as it does at the time of a turn to the right. However, when a motorcycle, a bicycle, or the like is travelling in parallel or, a left-hand side of the travelling vehicle 2, inter-vehicle communication may be performed with the motorcycle, the bicycle, or the like such that vehicle information is obtained. By doing this, a collision accident generated at the time of turning to the left can be prevented.

The communication device mounted the vehicle 2 determines whether a pedestrian or the like that is obstructing travel exists in accordance with the roadside machine information and the vehicle information that have been obtained, and reports information to a driver when an obstacle exists.

Figure 13:
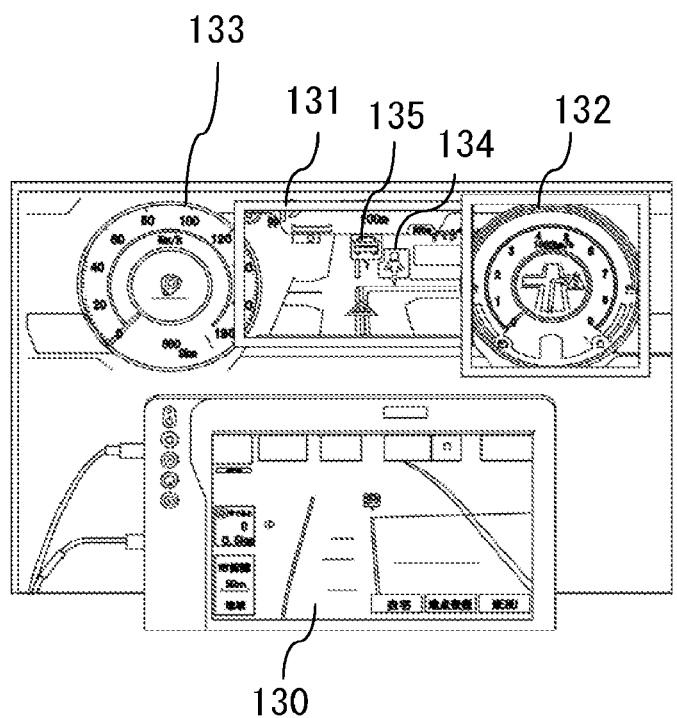
FIG. 13 illustrates an example of a display in a right turn collision prevention support service.

Reporting information to a driver refers, for example, to displaying an icon or the like that indicates a vehicle or a pedestrian at a corresponding point on a map 130 on a navigation screen or a corresponding point on an enlarged map 131 obtained by enlarging a corresponding intersection on the map 130, as illustrated in FIG. 13. At this time, an arrow indicating a travelling direction (for example, an arrow indicating right-hand turn) and a mark for attracting attention may be displayed, for example, in a middle portion of a tachometer 132, When displaying them, a map may be further enlarged. In this example, the enlarged map 131 is displayed on a screen between the tachometer 132 and a speed meter 133, and an icon 134 that indicates a pedestrian crossing a crosswalk at an intersection and an icon 135 that indicates an oncoming vehicle approaching the local vehicle are displayed on the enlarged map 131. By doing this, which position a vehicle or a pedestrian exists in with respect to the local vehicle can be accurately grasped, and safer driving can be performed. The map 130 is displayed on a screen below the enlarged map 131. Map information that causes the map 130 on the navigation screen to be displayed includes information relating to nodes that are nodal points in a road network expression including an intersection and the like, and information relating to links that are road sections between the nodes.

The display above may be linked with depression of an accelerator pedal or a brake pedal or with a direction indicator. In addition, information relating to the switching of the color of a traffic signal (for example, a remaining time before the traffic signal switched from green to red) may be displayed together with information relating to the pedestrian or the vehicle. The display manner above is not applied only to the right-turn/left-turn collision prevention support service, and can also be applied to another support service for safe driving.

Figure 6:
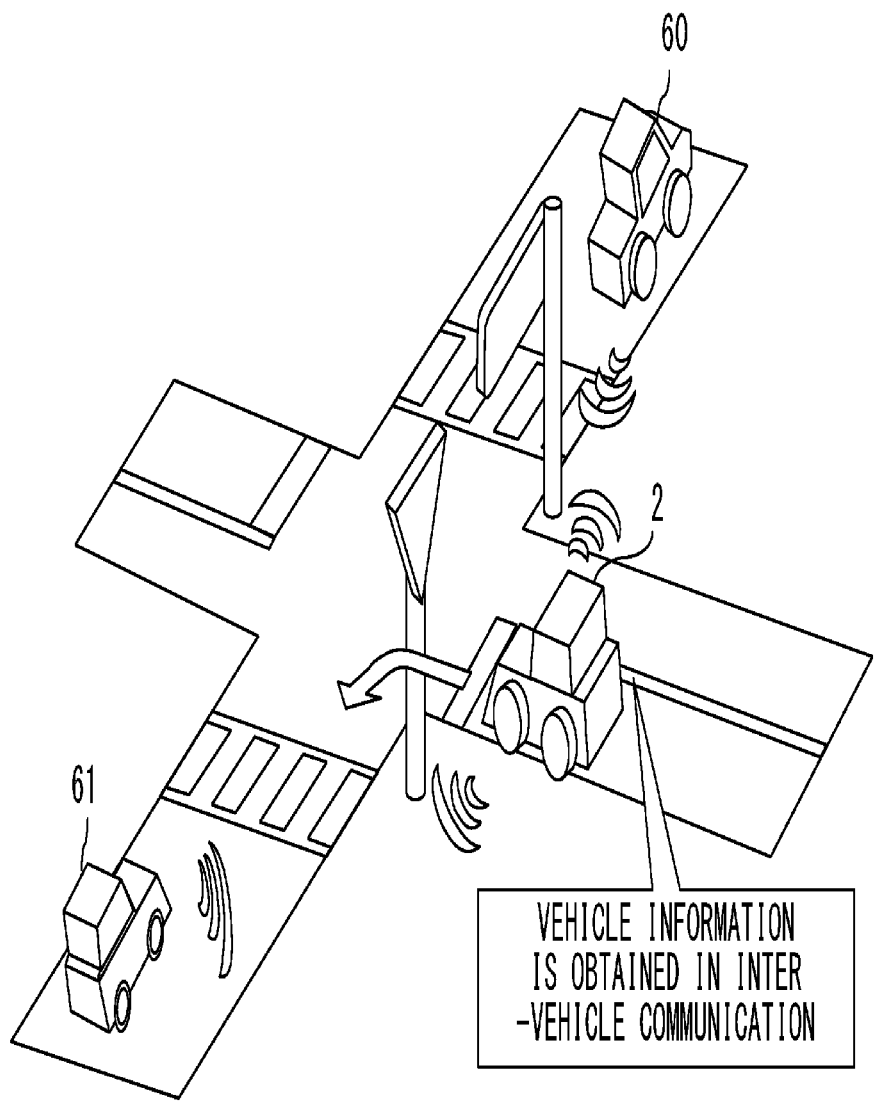
FIG. 6 is a diagram explaining a collision-upon-encounter prevention support service.

A collision-upon-encounter prevention support service is described next with reference to FIG. 6. The communication device mounted on the vehicle 2 obtains vehicle information of vehicles 60 and 61 entering an intersection without a traffic signal from leftward and rightward directions from respective communication devices mounted on the vehicles 60 and 61 in inter-vehicle communication. The communication device mounted on the vehicle 2 obtains vehicle information indicating a left-hand turn as local-vehicle information speed on the basis of speed information of the local vehicle and information indicated by a direction indicator. The communication device mounted on the vehicle 2 determines whether the vehicles entering the intersection obstruct travelling of the local vehicle on the basis of the obtained vehicle information, and when the vehicles obstruct travelling, the communication device mounted on the vehicle 2 displays icons or character information indicating the vehicles 60 and 61 in corresponding positions on a map on a navigation screen. The communication device mounted on the vehicle 2 obtains the speed information of the vehicle 60 on the basis of, for example, position information of the vehicle 60 and a change in the position information. The communication device mounted on the vehicle 2 determines whether the vehicle 60 and the vehicle 2 are located within a specified range after a prescribed time period on the basis of, for example, the position information of the vehicle 60, the speed information of the vehicle 60, the position information of the vehicle 2, the speed information of the vehicle 2, and the vehicle information indicating a left-hand turn that have been obtained. The communication device mounted on the vehicle 2 determines that the vehicle 60, which is entering the intersection, obstructs travelling of the local vehicle, for example, when the vehicle 60 and the vehicle 2 are located within the specified range after the prescribed time period. The communication device mounted on the vehicle 2 determines that the vehicle 60, which is entering the intersection, does not obstruct travelling of the local vehicle, for example, when the vehicle 60 and the vehicle 2 are not located within the specified range after the prescribed time period. By doing this, the existence of a vehicle or a pedestrian that a driver fails to see due to a blind spot can be grasped, and safe driving can be supported.

A support service for reporting the approach of a special vehicle (such as a construction vehicle, an emergency vehicle, or a public vehicle) to a driver in accordance with V2X information is provided, for example, in addition to the support services described above. In the case of the support service for reporting the approach of the special vehicle to a driver according to V2X information, the communication device mounted on the vehicle 2 can obtain, for example, a difference in the type of the special vehicle, such as a construction vehicle, an emergency vehicle, or a public vehicle, in inter-vehicle communication.

As another support service, a large number of icons or the like that indicate persons can be displayed on a map that corresponds to an area in which many persons gather in an event such as a festival or a concert. This can be implemented by performing V2X communication between portable terminals possessed by the persons and the communication device 3, and utilizing obtained V2X information, as described above. This can prevent a vehicle, for example, from travelling in an area in which many persons have gathered due to an event such as a festival or a concert.

An example of a function configuration of the communication device 3 according to the embodiment is described next with reference to FIG. 7. As illustrated in FIG. 7, the communication device 3 is configured by a communication unit 71, a controller 72, and a storage 78, and the controller 72 is further configured by a processing unit 73, a determination unit 74, a display controller 75, a detector 76, and a specification unit 77. The configuration of the communication device 3 is not limited to the configuration above, and the communication device 3 may include other components.

The communication unit 71 performs radio communication with an external device, and receives communication information (V2X information) according to a preset communication condition. Specifically, the communication unit 71 includes the function of the communication driver 20 illustrated in FIG. 2, and receives vehicle information and roadside machine information that are output from another communication device 3 and the roadside machine 4. In a case in which V2X information is communicated, the communication unit 71 is configured such that radio communication of 760 MHz and radio communication of 5.9 GHz can be performed in Japan and in North America and Europe, respectively. The received vehicle information and roadside machine information are stored in the storage 78, In addition, the communication unit 71 regularly or irregularly outputs vehicle information of the vehicle 2 mounted with the communication device 3 to the outside. The roadside machine 4 as an external device that performs radio communication with the communication unit 71 includes a communication unit that has a configuration basically similar to that of the communication device 3 such that radio communication can be performed with the communication device 3.

The control unit 72 controls the operation of the communication device 3. Specific control is performed by the processing unit 73, the determination unit 74, the display controller 75, the detector 76 and the specification unit 77.

The processing unit 73 includes the roadside machine system service management function 25 and the inter-vehicle system service management function 26, and the processing unit 73 updates respective prescribed services on the basis of the vehicle information, the roadside machine information, and the local-vehicle information that have been obtained.

The determination unit 74 determines whether a prescribed service should be provided in accordance with the received communication information. Specifically, the determination unit 74 includes a V2X management function 27 and a map display function 28, and determines whether a prescribed service should be provided in accordance with an update result of the processing unit 73.

When a prescribed service should be provided according to a determination result, the display controller 75 displays display information needed to provide the prescribed service on a map displayed on a display unit such as the navigation display 30. In addition, the display controller 75 may display the display information on the map according to the movement of a moving body (such as an oncoming vehicle). Stated another way, the display controller 75 displays an icon displayed on the map that indicates, for example, an oncoming vehicle while moving the icon over time.

The detector 76 detects whether the specified vehicle described later exists in accordance with the received V2X information (such as the roadside machine information or the vehicle information).

The specification unit 77 specifies a travelling route of the specified vehicle. The specification unit 77 obtains the travelling route of the specified vehicle that has been predicted from the speed information of the specified vehicle, the steering angle of a steering wheel, and the information indicated by the direction indicator, for example, via the communication unit 71. The specification unit 77 is configured to he able to specify the travelling route of the specified vehicle such that the obtained travelling route and the position information of the specified vehicle match the latitude and longitude on the map.

The storage 78 stores a program for causing the controller 72 to perform various processes, and also stores, for example, V2X information, such as the vehicle information or the roadside machine information, and the local-vehicle information.

Figure 8:
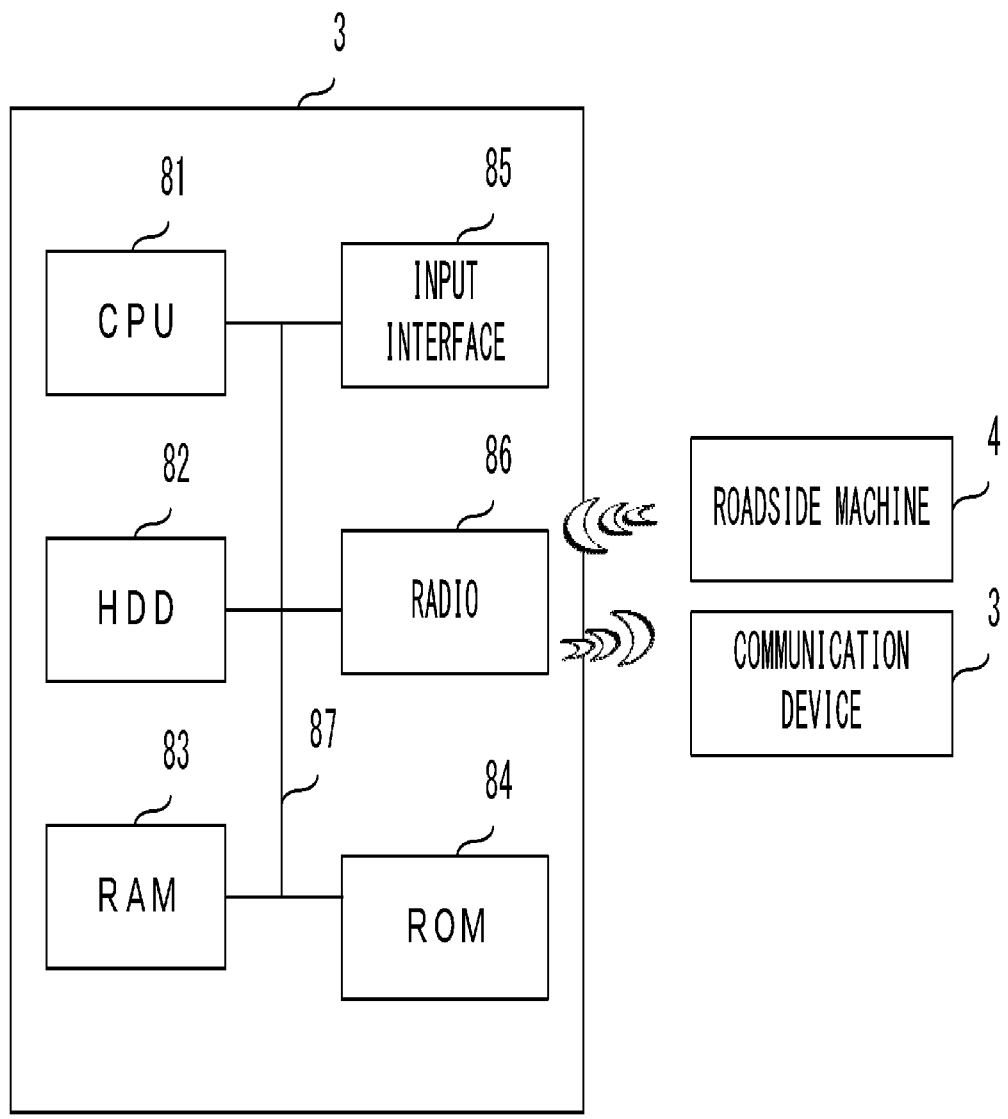
FIG. 8 illustrates an example of a hardware configuration for implementing the communication device according to the embodiment.

An example of a hardware configuration for implementing the communication device 3 according to the embodiment is described next with reference to FIG. 8. As illustrated in FIG. 8, the hardware configuration includes, for example, a central processing unit (CPU) 81, a hard disk drive (HDD) 82, a random access memory (RAM) 83, a read-only memory (ROM) 84, an input interface (I/F) 85, a radio 86, and a bus 87. The CPU 81, the HDD 82, the RAM 83, the ROM 84, the input interface (I/F) 85, and the radio 86 are connected to each other for example, via the bus 87.

The CPU 81 reads a program (such as a communication program) for performing various processes of the communication device 3, the program having been stored in the HDD 82 or the like, temporarily stores the read program in the RAM 83, and performs the various processes according to the program. The CPU 81 principally functions as the controller 72 described above.

In the HDD 82, an application program for performing the various processes of the communication device 3, data needed for the processes of the communication device 3, and the like are stored. The HDD 82 principally functions as the storage 78 described above.

The RAM 83 is a volatile memory, and a portion of an operating system (OS) program or an application program to be executed by the CPU is temporarily stored in the RAM 83 Various types of data needed to perform processing by using the CPU 81 are also stored in the RAM 83.

The ROM 84 is a non-volatile memory, and stores a program such as a boot program or a basic input/output system (BIOS).

The input interface (I/F) 85 receives information that is input via a remote controller, a touch panel, or the like that is not illustrated.

The radio 86 transmits or receives data (such as V2X information) to/from the outside (such as the communication device 3 or the roadside machine 4), and principally functions as the communication unit 71 described above.

The bus 87 is a route that mediates transmission and reception of a control signal, a data signal, and the like among respective devices.

Figure 9:
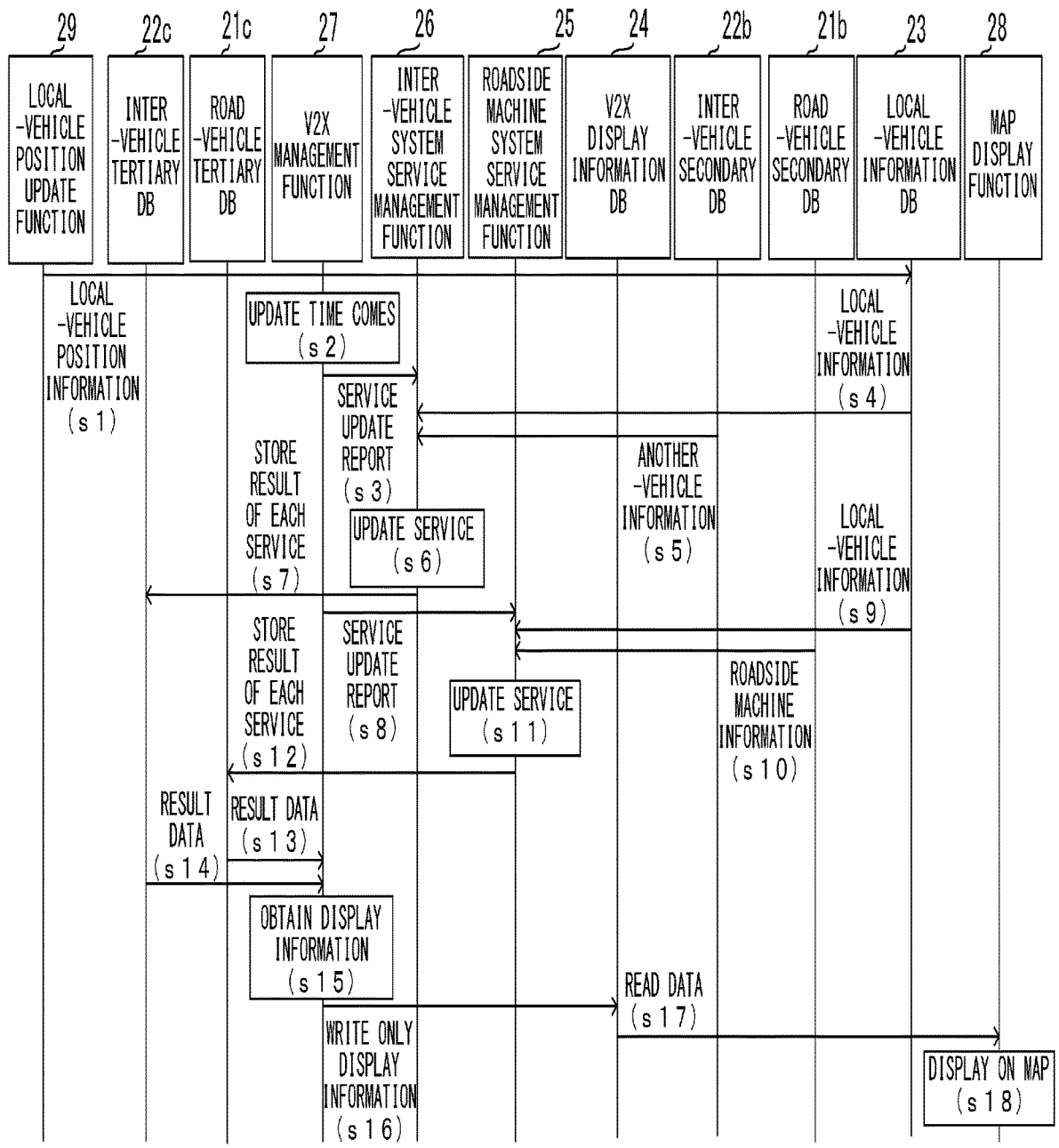
FIG. 9 is a sequence chart illustrating an example of a sequence illustrating processing for providing a prescribed service of the communication device according to the embodiment.

An example of a sequence of processing for Providing a prescribed service of the communication device according to the embodiment is described next with reference to FIG. 9. As illustrated in FIG. 9, local-vehicle position information that is regularly or irregularly updated is stored in the local-vehicle information DB 23 (s1). When the time to update a prescribed service (an update time) comes (s2), the V2X management function 27 issues a service update report of the prescribed service (s3 and S8). In response to the service update report, local-vehicle information is obtained from the local-vehicle information DB 23 (s4), and another-vehicle information is obtained from the inter-vehicle secondary DB 22b (s5) The inter-vehicle system service management function 26 updates respective prescribed services according to the obtained local-vehicle information and another-vehicle information (s6). Update results of the respective prescribed services are stored in the inter-vehicle tertiary DB 22c (s7). As an example, an update result in a case in which a prescribed service is the right-turn collision prevention support service includes, for example, the position information of an oncoming vehicle with respect to the position of the local vehicle.

In response to the service update report (s8), local-vehicle information is obtained from the local-vehicle information DB 23 (s9), and road, ide machine information is obtained from the road-vehicle secondary DB 21b (s10). The roadside machine system service management function 25 updates the respective prescribed services according to the obtained local-vehicle information and roadside machine information (s11). Update results of the respective prescribed services are stored in the road-vehicle tertiary DB 21c (s12). As an example, an update result in a case in which a prescribed service is the right-turn collision prevention support service includes, for example, the position information of a pedestrian or the like in an intersection with respect to the position of the local vehicle.

Data of the update result is obtained from the road-vehicle tertiary DB 21*c* (s13), and data of the update result is obtained from the inter-vehicle tertiary DB 22*c* (s14). The V2X management function 27 determines whether the prescribed service should be provided in accordance with the update results, and when the prescribed service should be provided, the V2X management function 27 obtains information (display information) needed to provide the prescribed service (s15). Only the obtained display information is stored in (written to) the V2X display information DB 24 (s16). The stored display information (data) is read (s17), and the map display function 28 displays, for example, an icon that indicates a pedestrian or the like on a map (s18).

Figure 10:
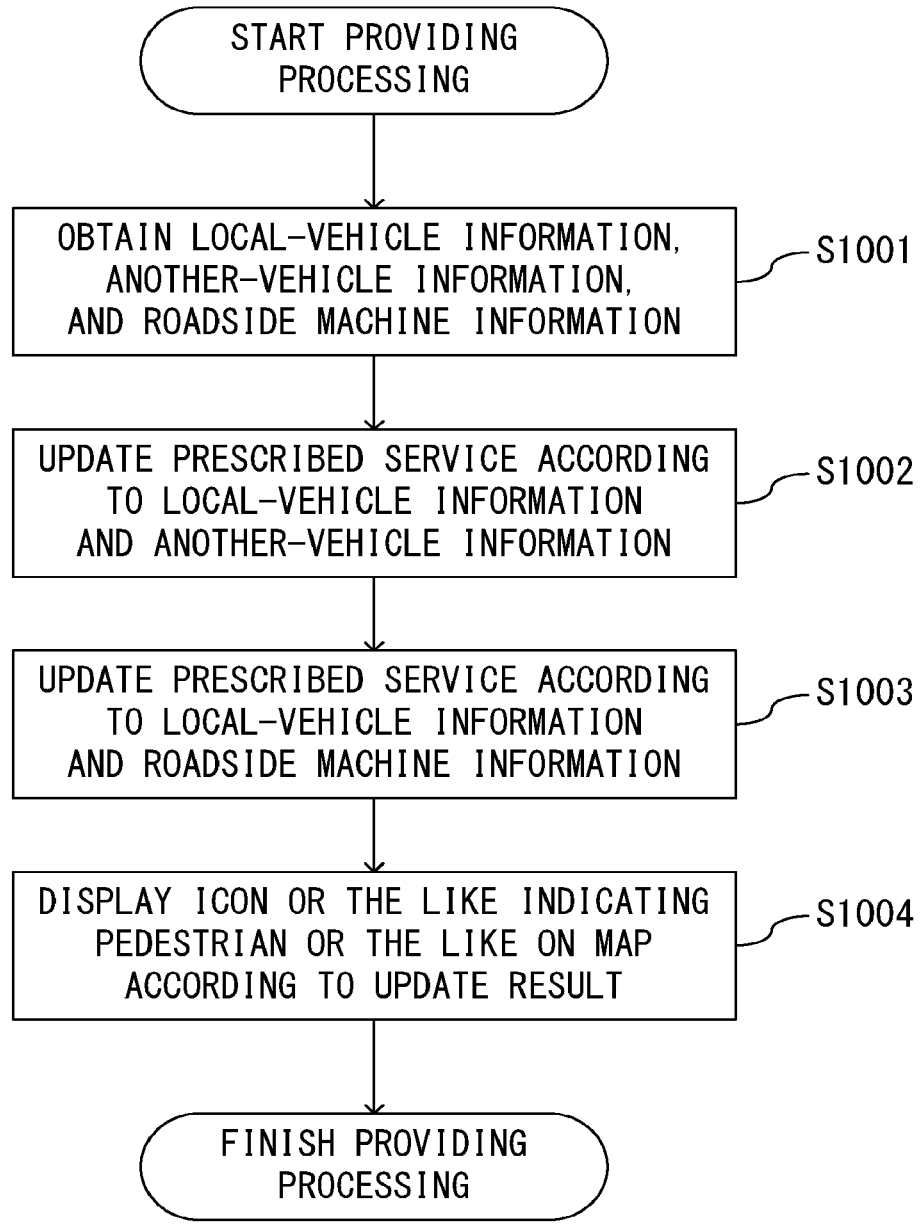
FIG. 10 is a flowchart illustrating an example of a flow of processing for providing a prescribed service of the communication device according to the embodiment.

An example of a flow of processing for providing a prescribed service of the communication device 3 according to the embodiment is described next with reference to FIG. 10. When the time to update a prescribed service comes, the communication device 3 obtains local-vehicle information from the local-vehicle information DB 23, obtains another-vehicle information from the inter-vehicle secondary DB 22*b*, and obtains roadside machine information from the road-vehicle secondary DB 21*b* (step S1001). The communication device 3 updates the prescribed service according to the local vehicle information and the another-vehicle information that have been obtained (step S1002), and also updates the prescribed service according to the local-vehicle information and the roadside machine information that have been obtained (step S1003).

The communication device 3 obtains display information to be displayed on a map according to update results of respective updates, and displays an icon or character information indicating a pedestrian, a vehicle, or the like on the map (step S1004).

In the description above, when a vehicle or a pedestrian exists around the local vehicle at an intersection or the like, an icon indicating the vehicle or the pedestrian is displayed in a corresponding position on a map such that safe driving can be supported. Here, a communication device is described that displays, on a map, the movement of a specified vehicle that is, for example, an emergency vehicle in an emergency, such as an ambulance, a fire engine, a police car, or a vehicle of a gas company for coping with a gas leak and the like, when the specified vehicle exists around the local vehicle. In the case of a support service fore reporting the approach of a special vehicle to a driver according to V2X information, communication device mounted on the vehicle 2 can obtain, for example, a difference in the type of an emergency vehicle, such as the ambulance, the fire engine, the police car, or the vehicle of the gas company for coping with a gas leak and the like, in inter-vehicle communication. The communication device mounted on the vehicle 2 can also obtain, for example, identification information (ID) of the emergency vehicle in inter-vehicle communication.

First, a display on a map of a specified vehicle, for example, in a case in which the specified vehicle is travelling towards the local vehicle on an opposite lane is described with reference to FIGS. 11A and 11B. As illustrated in FIG. 11A, assume that a specified vehicle 110 is approaching the local vehicle 111. A communication device 3 of the local vehicle 111 performs inter-vehicle V2X communication with a communication device of the specified vehicle 110, and obtains vehicle information (V2X information) of the specified vehicle 110. The vehicle information of the specified vehicle 110 may be obtained by being reported from the emergency information, reporting system described above in V2X communication.

The communication device 3 detects whether a prescribed specified vehicle exists in accordance with the obtained V2X information. When the existence of the prescribed specified vehicle is detected, display information (characters or an icon) relating to the prescribed specified vehicle is displayed on the map.

Specifically, the obtained vehicle information includes information that specifies the specified vehicle 110 (such as identification information), and the communication device 3 determines whether an approaching vehicle is the specified vehicle 110 in accordance with the included information and information for specifying a specified vehicle that has been stored in the storage 78 or the like. When it is determined that the approaching vehicle is the specified vehicle 110, an icon or the like that indicates the specified vehicle 110 is displayed according to the position information of the local vehicle 111 and the obtained vehicle information of the specified vehicle 110 in such a way that the icon or the like is superimposed onto a map displayed on the navigation display 30 described above. An example of the display is illustrated in FIGS. 11A and 11B.

FIG. 11A illustrates an example of a display in a case in which a positional relationship on a map between the specified vehicle 110 and the local vehicle 111 is viewed from the top. The communication device 3 displays an icon indicating a moving body (the specified vehicle 110) on a map in accordance with the movement of the moving body. By doing this, the icon indicating the specified vehicle 110 moves over time, and is displayed so as to be approaching an icon indicating the local vehicle 111. The same is applied to FIG. 11B. The communication device 3 associates the position information including longitude and latitude of the local vehicle 111 with map information in order to display the local vehicle 111 on the map, and the communication device 3 displays the icon indicating the local vehicle 111 on the navigation display 30 such that the icon indicating the local vehicle 111 is superimposed onto the map. The local vehicle 111 is arranged in such a way that the position information of the local vehicle 111 matches nodes or links in the map information by performing map matching processing. The communication device 3 associates the position information including longitude and latitude of the specified vehicle 110 with the map information in order to display the specified vehicle 110 on the map, and displays an icon indicating the specified vehicle 110 on the navigation display 30 in such a way that the icon indicating the specified vehicle 110 is superimposed onto the map The specified vehicle 110 is arranged in such a way that the position information of the specified vehicle 110 matches the nodes or links in the map information by performing the map matching processing. The map matching processing is performed at each fixed distance of the local vehicle 111 and at each prescribed distance of the specified vehicle 110. In the map matching processing, a process for arranging the present positions of the local vehicle 111 and the specified vehicle 110 on the road on the map is performed. In the map matching processing, when the present locations of the local vehicle 111 and the specified vehicle 110 are not on the road, positions on the road near the present positions of the local vehicle 111 and the specified vehicle 110 are estimated as the present positions of the local vehicle 111 and the specified vehicle 110. In the map matching processing, when the present locations of the local vehicle 111 and the specified vehicle 110 are on the road, the positions on the road of the local, vehicle 111 and the specified vehicle 110 are estimated as present positions. The icon indicating local vehicle 111 and the icon indicating the specified vehicle 110 are distinguished from each other by using identification information (ID), and are displayed.

FIG. 11B illustrates an example of a display in a case in which the, specified vehicle 110 approaching the local vehicle 111 illustrated in FIG. 11A is viewed from a side of the local vehicle 111. The icon indicating the specified vehicle 110 approaches the icon indicating the local vehicle 111 over time Stated another way, the icon indicating the specified vehicle 110 is enlarged over time. FIG. 11B also displays a pedestrian 112 in an intersection. By doing this, the local vehicle 111 can be stopped on a road shoulder or the like with time to spare in order not to obstruct the travelling of the specified vehicle 110. When the local vehicle 111 and the specified vehicle 110 pass each other, and when a distance between both of the vehicles is greater than or equal to a prescribed distance or an elapsed time period after passing each other is greater than a prescribed time period, the icon indicating the specified vehicle 110 disappears from the map. An enlarged icon may be displayed when the specified vehicle 110 turns at an intersection. The size of the icon may be changed according to a change in a scale of the height of a building. The icon may be di splayed so as to be caused to blink. The size of the icon does not always need to be changed.

The specified vehicle 110 may be displayed on the map of the navigation display 30 as described above and the existence of the specified vehicle 110 may be displayed on the display section of a tachometer rather than on the map.

In addition, which traffic lane of a plurality of traffic lanes the specified vehicle 110 is travelling in may be displayed on the map or the like, by using a not-illustrated high-accuracy locator.

Figure 12:
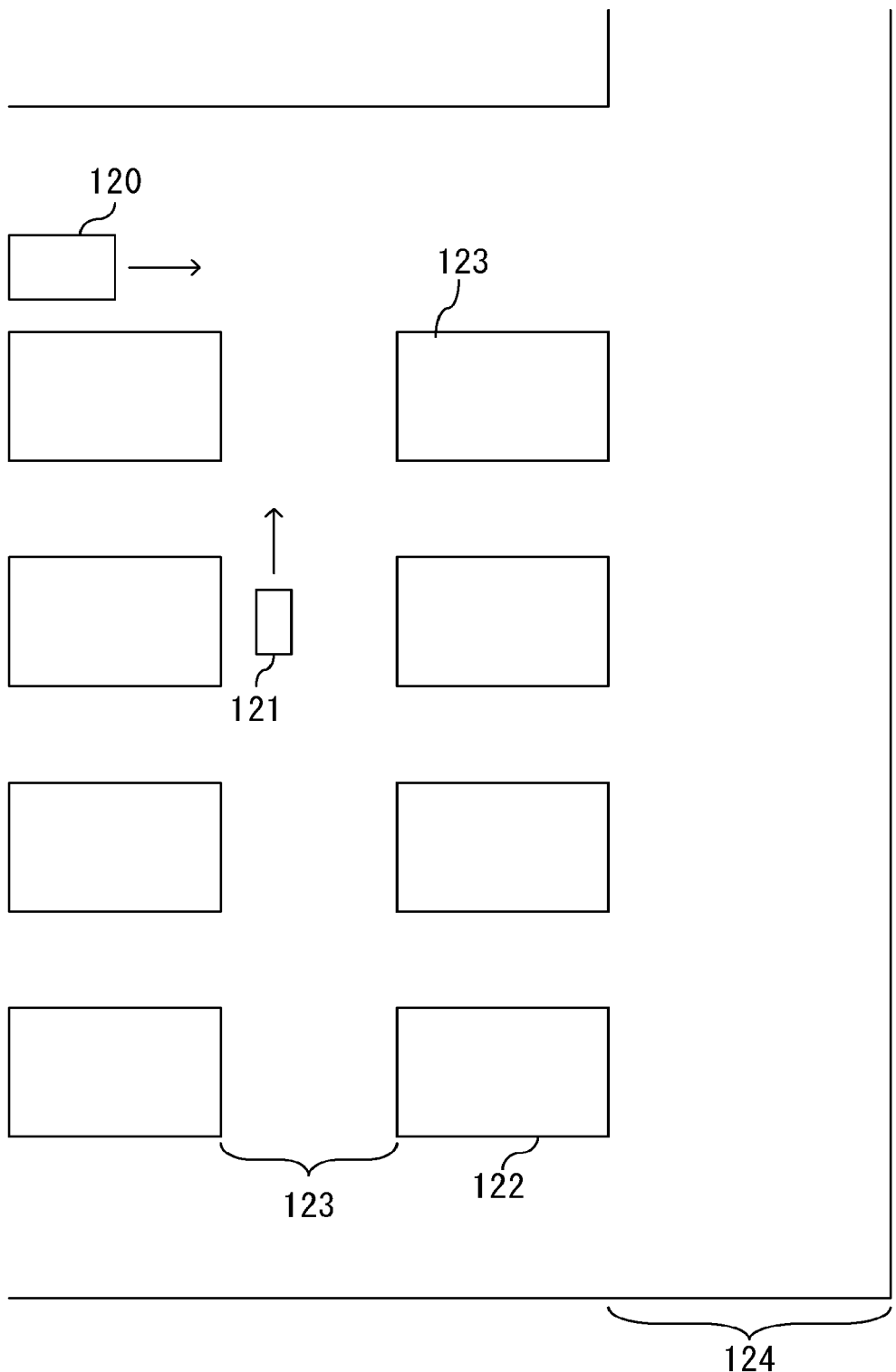
FIG. 12 is a diagram explaining a display on a map of a travelling route of a specified vehicle in a case in which the specified vehicle exists around the local vehicle according to the embodiment.

A display of a specified vehicle on a map, for example, in a case in which the specified vehicle exists around the local vehicle is described next with reference to FIG. 12. FIG. 12 a diagram in a case in which an urban district lined with a plurality of buildings 123 including a hospital 122 is viewed from the top. As illustrated in FIG. 12, assume that a specified vehicle 120 is travelling towards the hospital 122 in order to transport a person with an emergency situation or the like. In this case, a communication device 3 of the local vehicle 121 performs V2X communication with a communication device of the specified vehicle 120, and the like, and receives (obtains) V2X information. The communication device 3 of the local vehicle 121 detects whether a specified vehicle exists in accordance with the received V2X information (roadside machine information or vehicle information). Specifically, the communication device 3 of the local vehicle 121 determines whether the specified vehicle 120 exists in accordance with the obtained V2X information and information for specifying a specified vehicle that has been stored in the storage 78 or the like. As a result of the determination, in the case of the example above, it is recognized that the specified vehicle 120 exists.

However, when the specified vehicle 120 exists in the vicinity, but when the positional relationship between the local vehicle 121 and the specified vehicle 120 is as illustrated in FIG. 12, the specified vehicle 120 does not always turn to the right and pass the local vehicle 121. This is because the specified vehicle 120 may travel straight ahead. In a case in which the specified vehicle 120 travels straight ahead, the local vehicle 121 and the specified vehicle 120 do not pass each other, and therefore the specified vehicle 120 can travel without stopping the local vehicle 121 on a road shoulder.

The travelling of the specified vehicle 120 basically has a travelling rule, and it is assumed, for example, that the travelling rule includes a rule wherein the specified vehicle 120 travels with priority given to a road with a large width (a main street) Under the rule above, when the width of a road 124 that one block ahead when viewed from the specified vehicle 120 (a road on a right-hand side of a road 123 on which the local vehicle 121 is travelling) is greater that the width of the road 123 on which the local vehicle 121 is travelling, the specified vehicle 120 does n turn to the right but travels straight ahead, and turns to the right so as to travel on the road 124.

Accordingly, the communication device 3 of the local vehicle 121 specifies a travelling route of the specified vehicle. Specifically, the communication device 3 of the local vehicle 121 recognizes the existence of the specified vehicle 120, and compares the width of the road 123 on which the local vehicle 121 is travelling with the width of a road on which the specified vehicle 120 is predicted to travel. As a result of this, when it is determined that the width of the road 123 on which the local vehicle 121 is travelling is greater, the road 123 is specified to be a travelling route of the specified vehicle 120. By doing this, it is determined that the specified vehicle 120 will turn to the right and will pass the local vehicle 121 (travelling routes will overlap each other).

In this case, the communication device 3 displays a line or the like that indicates the travelling route of the specified vehicle 120, on a road on the map that corresponds to a road on which the local vehicle 121 will travel. Consequently, a specified vehicle that affects the travelling of the local vehicle can be grasped even in a place where the visibility is actually poor, and a sudden accident can be coped with.

When it is determined that both of the vehicles will not pass each other, the line indicating the travelling route of the specified vehicle 120 does not need to be displayed on the map. In this case, the line indicating the travelling route of the specified vehicle 120 is not displayed. This is because the specified vehicle 120 does not obstruct the travelling of the local vehicle 121. Even when it is determined that both of the vehicles will not pass each other, the line indicating the travelling route of the specified vehicle 120 may be displayed. In this case, the mariner in which the line is displayed may be changed, for example, by drawing the line with a broken line.

The roadside machine information transmitted from the roadside machine 4 via radio communication is normally transmitted within a range of 200 m to 300 m. In general, the accuracy of road information transmitted from a roadside machine is higher than the accuracy of road information specified by a car navigation device or a portable terminal such as a smartphone having a navigation function. Accordingly, when the local-vehicle position is within a range in which the roadside machine information can be received from the roadside machine 4, the communication device 3 can display the local vehicle position specified by the navigation function and the longitude and latitude specified by information from the specified vehicle and the road information from the roadside, machine on the map in such a way that the local-vehicle position and the longitude and latitude overlap each other. When the local-vehicle position is not within the range in which the roadside machine information can be received from the roadside machine 4, the communication device 3 displays the local-vehicle position specified by the navigation function and the longitude and latitude specified by the information from the specified vehicle and the road information indicated by the navigation function on the map in such a way that the local-vehicle position and the longitude and latitude overlap each other. In other words, the communication device 3 may be configured so as to be able to switch the road information between the roadside machine information from the roadside machine 4 and the information indicated by the navigation function of the communication device 3. The communication device 3 may be configured, for example, such that the communication unit can determine that the local-vehicle position is within a range in which the roadside machine information fails to be received from the roadside machine 4 when the intensity of radio communication from the roadside machine 4 is smaller than a prescribed value or a prescribed position.

Even if the attention-attracting display is used, the driver may not grasp accurately where the vehicle or pedestrian exists, and the driver may become even more anxious. Therefore, the attention-distracting display has not been useful to support safe driving. The embodiment of the present invention can provide a communication device which accurately informs the driver of the position where the vehicle or pedestrian exists with regard to the local vehicle, better supporting safer driving.

The above explanation was made on the basis of a left-hand traffic system which vehicles travel on the left side of a road. The above explanation should therefore be modified where needed in a relevant manner (i.e., reversed) to match a right-hand traffic system in which vehicles travel on the right side of a road.

The present invention is not limited to the embodiment above with no change, and components can be varied and embodied without departing from the gist of the embodiment above in an implementing stage. Various inventions can be made by appropriately combining a plurality of components disclosed in the embodiment above. As an example, all of the components disclosed in the embodiment may be appropriately combined. It goes without saying that various variations or applications can be made without departing from the spirit of the invention.

What is claimed is:

1. A communication device mounted on a moving body, the communication device comprising:
   a memory that stores a program;
   a radio that receives communication information according to a preset communication condition;
   a processor that determines whether a service is provided in accordance with the received communication information, the processor executing a process according to the program;
   a display controller that displays display information needed to provide the service on a map displayed on a display unit, when the service is provided according to a result determined by the processor; and
   a detector that detects whether an emergency vehicle exists in accordance with the received communication information,
   wherein the display controller displays an icon indicating the emergency vehicle on a road on the map in the case of existence of the emergency vehicle is detected,
   wherein the display controller enlarges the icon indicating the emergency vehicle on the map over time in the case of the emergency vehicle approaching the moving body,
   wherein the display controller makes the icon indicating the emergency vehicle on the map disappear in the case of the emergency vehicle and the moving body pass each other, and a distance between both is greater than or equal to a prescribed distance or an elapsed time period after passing each other is greater than a prescribed time period, and
   wherein the display controller makes an enlarged map by enlarging a corresponding intersection on the map and displays the enlarged map on a screen between a tachometer and a speedometer.

2. The communication device according to claim 1, wherein when the display information includes information relating to the moving body, the display controller displays the display information on the map according to a movement of the moving body.

3. The communication device according to claim 1, wherein the processor specifies a travelling route of the emergency vehicle on the basis of a traveling rule, and
   wherein the display controller performs:
   displaying the specified travelling route of the emergency vehicle on the map when the specified travelling route overlaps the travelling route of a vehicle mounted with the communication device; and
   not displaying the specified travelling route of the emergency vehicle when the specified travelling route does not overlap the travelling route of the vehicle mounted with the communication device.

4. The communication device according to claim 1, wherein the preset communication condition is communication of vehicle-to-everything information.

5. The communication device according to claim 1, wherein the communication information includes at least one of roadside machine information obtained from a roadside machine, moving body information obtained by the moving body, and emergency information obtained from an emergency information reporting system.

6. The communication device according to claim 1, wherein the communication information includes local-vehicle information on a basis of operating information of the moving body, another-vehicle information on a basis of operating information of an another vehicle from another communication device mounted in the another vehicle, and roadside machine information on a basis of a detection result in a surrounding environment of the moving body from a roadside machine installed in the surrounding environment of the moving body.

7. The communication device according to claim 1, wherein the display controller displays a line indicating the traveling route of the emergency vehicle.

8. The communication device according to claim 1, wherein the display controller displays the icon indicating the emergency vehicle on the map of the display unit and the existence of the emergency vehicle is displayed on a display section rather than on the map.

* * * * *